United States Patent [19]
Kushiyama et al.

[11] Patent Number: 5,009,581
[45] Date of Patent: Apr. 23, 1991

[54] FLUID ACCUMULATOR FOR ANTI-SKID BRAKES

[75] Inventors: Takashi Kushiyama; Yoshiyasu Kurihara, both of Higashimatsuyama, Japan

[73] Assignee: Jidosha Kiki Co., Ltd., Tokyo, Japan

[21] Appl. No.: 453,513

[22] Filed: Dec. 20, 1989

[30] Foreign Application Priority Data

Dec. 27, 1988 [JP] Japan ............... 63-330225

[51] Int. Cl.⁵ ............................. F04B 11/00
[52] U.S. Cl. ....................... 417/540; 303/87
[58] Field of Search ............... 417/540, 542, 543, 313; 303/87

[56] References Cited

U.S. PATENT DOCUMENTS

| | | |
|---|---|---|
| 1,748,793 | 2/1930 | Prawet et al. ............... 303/87 |
| 2,142,410 | 1/1939 | Quick ....................... 303/87 |
| 3,477,232 | 11/1969 | Porter ...................... 303/87 |
| 4,188,073 | 2/1980 | Ishikawa et al. ............. 303/87 |

Primary Examiner—Leonard E. Smith
Assistant Examiner—David W. Scheuermann
Attorney, Agent, or Firm—Varndell Legal Group

[57] ABSTRACT

In the sump unit 1 of this invention, the sump unit 1 is installed in the operating fluid passage 4, and the fluid accommodating chamber 1a is formed as a part of the operating fluid passage 4.

Therefore, the sump unit 1 does not protrude extensively from the operating fluid passage 4, and the fluid pressure control unit can be designed in more compact form. Because the fluid accommodating chamber 1a of the sump unit 1 is formed as a part of the operating fluid passage 4, the air intermingled with the operating fluid in the fluid accommodating chamber 1a can be easily withdrawn, and this extensively facilitates the air vent of the fluid pressure control unit.

4 Claims, 2 Drawing Sheets

FLUID ACCUMULATOR FOR ANTI-SKID BRAKES

BACKGROUND OF THE INVENTION

The present invention relates to a sump unit used, for example, for fluid pressure circuit of anti-skid brake system for automobile.

In general, the anti-skid brake system for automobile is designed in such structure that the brake fluid in the wheel cylinder is released to a sump unit by switching over the electromagnetic valve when the skid condition of the wheel is detected during braking operation. Thus, by decreasing the brake pressure of the wheel cylinder, skid is eliminated. After the skid condition of the wheel is eliminated, the electromagnetic valve is switched over to increase the brake fluid pressure of the wheel cylinder in order to shorten the braking distance.

As the sump unit to be used for the fluid pressure circuit of the anti-skid brake system, the sump unit as shown in FIG. 2 has been conventionally used.

In FIG. 2, the sump unit 1' is mounted in such manner that it is communicated with the operating fluid passage 4, leading from the electromagnetic valve 2 to the oil pump 3. Namely, the sump unit 1' is installed on the main unit of the anti-skid brake modulator 5, and it is provided with a bore 6' having one end communicated with the operating fluid passage 4 and the other end opened outwardly and also with a piston 7' slidably engaged in this bore 6'. This piston 7' is pushed toward the operating fluid passage 4 at all times by a spring 8. The end of the spring 8 opposite to the piston 7' is supported by a spring receptacle 10 fixed on the main unit 5. On the side of the piston 7' facing the operating fluid passage 4, a fluid accommodating chamber 1'a is formed by the piston 7'.

In the sump unit 1' having such structure, when a wheel is in skid condition, the electromagnetic valve 2 corresponding to the wheel in skid condition is switched over, and the brake fluid discharged from the wheel cylinder of the wheel is sent into the fluid accommodating chamber 1'a.

Because the bore 6' is branched off from the operating fluid passage 4 in such sump unit 1', the sump unit 1' extensively protrudes from the operating fluid passage 4 to the lateral direction. For this reason, it is necessary to keep larger space for the sump unit 1', and this means the increase of the size of anti-skid brake modulator.

The fluid accommodating chamber 1'a of the sump unit 1' is formed just like a blind alley. Therefore, the air intermingled with the operating fluid in the fluid accommodating chamber 1'a cannot be efficiently withdrawn.

SUMMARY OF THE INVENTION

The object of this invention is to provide as small fluid pressure control unit as possible and to facilitate the air vent.

To attain the above object, the sump unit according to the present invention is characterized in that a piston with graded steps comprising a large diameter piston member and a small diameter piston member, forming a fluid accommodating chamber, is furnished in the operating fluid passage of the fluid pressure control unit with said large diameter piston member and said small diameter piston member being liquid-tightly and slidably mounted, that said piston with graded steps is pushed toward said large diameter piston member at all times by a pushing means, and that said piston with graded steps is provided with a bore passing through to the axial direction and forming a part of said operating fluid passage.

The sump unit by this invention with the construction as described above is installed in the operating fluid passage. This prevents the sump unit from extensively protruding from the operating fluid passage to the lateral direction. Therefore, there is no need to increase the size of the fluid pressure control unit.

Because the sump unit is installed in the middle of the operating fluid passage, the fluid accommodating chamber of the sump unit is not formed like a blind alley. This facilitates easier withdrawal of the air intermingled with the operating fluid in the operating fluid accommodating chamber.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following, description will be given on the embodiments of this invention in connection with the drawings.

Figure 1:
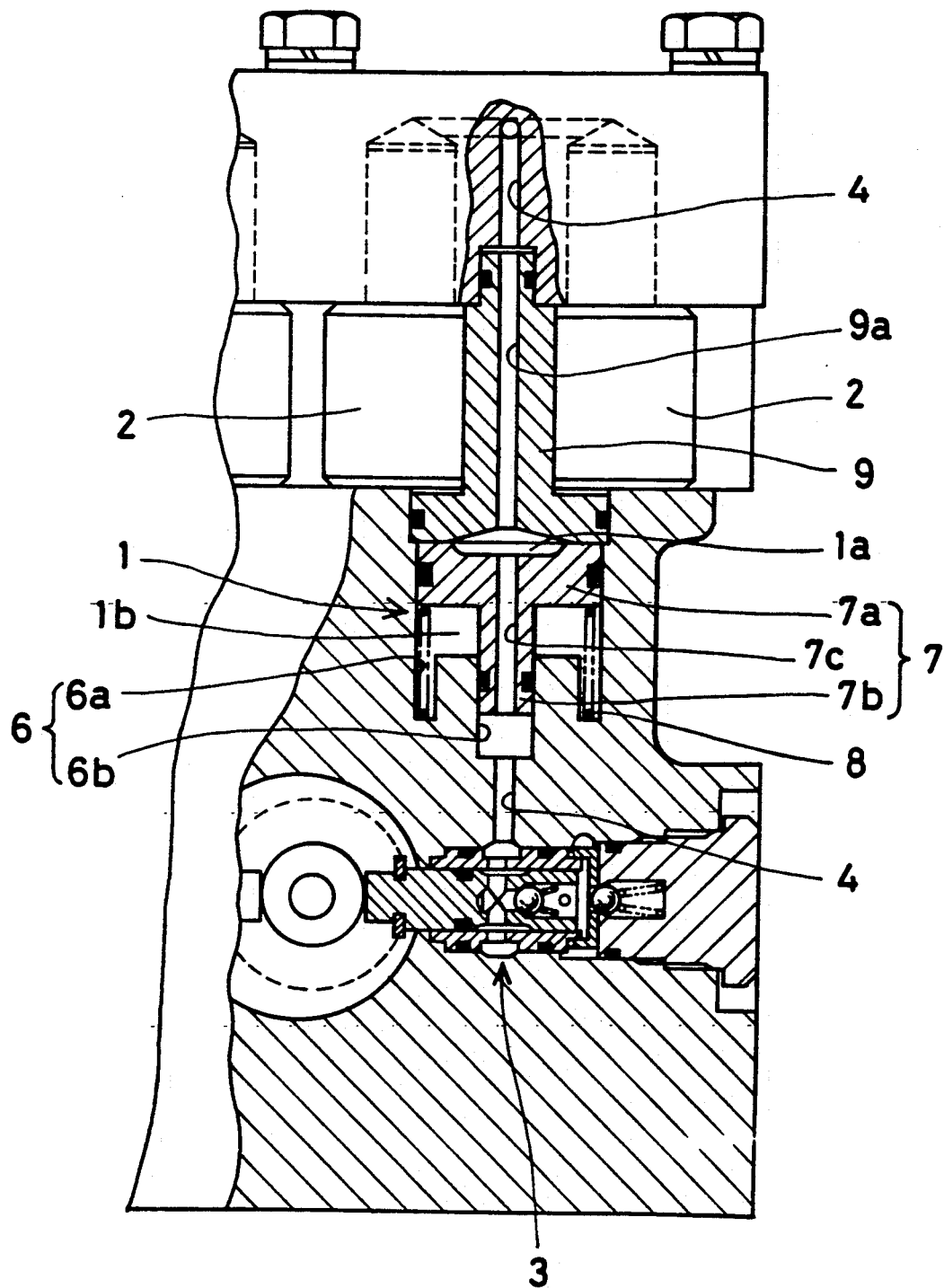
FIG. 1 is a sectional view of an embodiment of the sump unit according to this invention when it is applied to an anti-skid control unit.
Figure 2:
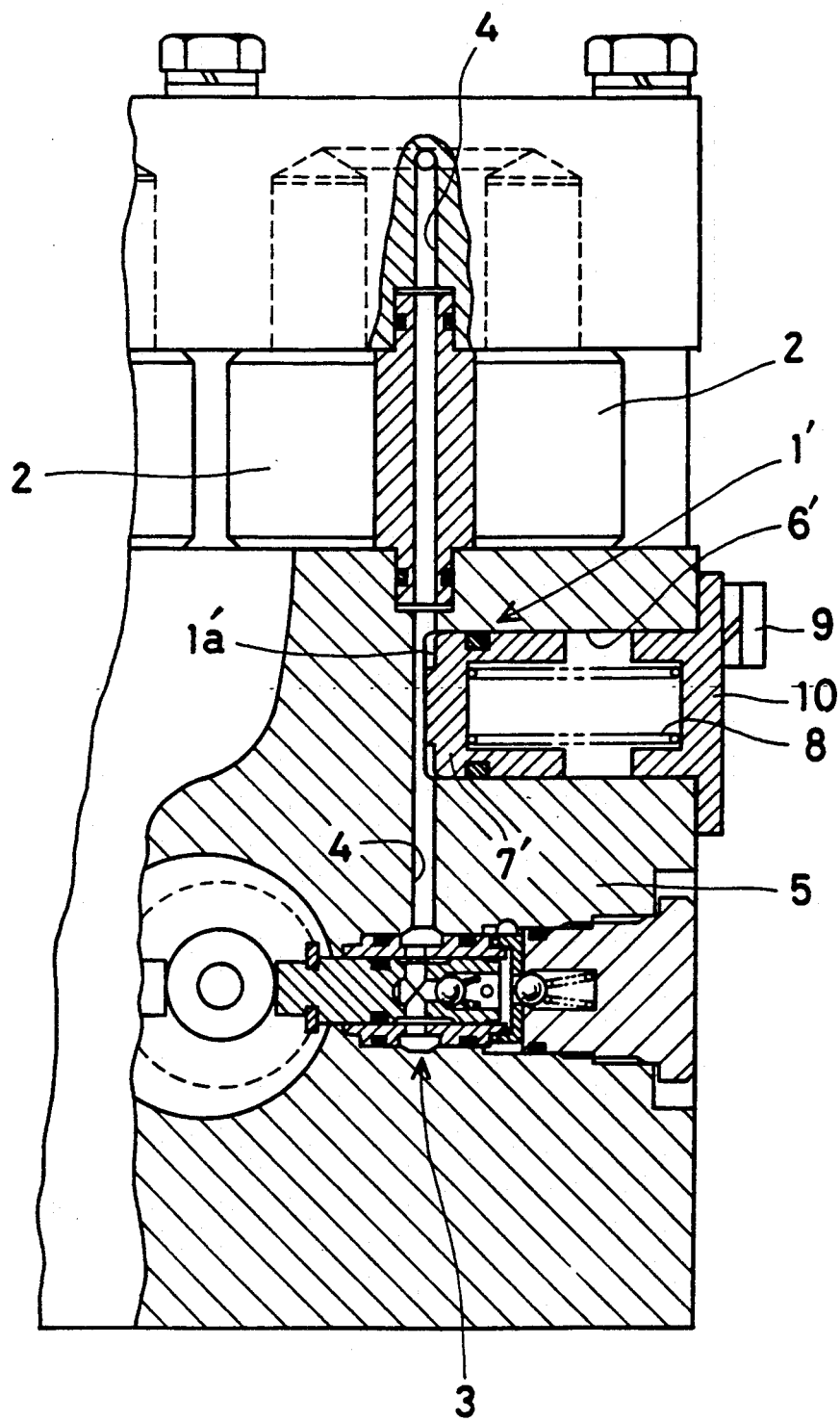
FIG. 2 is a sectional view of a conventional type sump unit.

As it is evident from FIG. 1, a sump unit 1 is installed in an operating fluid passage 4 between an electromagnetic valve 2 and a pump 3.

This sump unit 1 is formed in the operating fluid passage 4 and is provided with a bore 6 extending to the same direction as the operating fluid passage 4. The bore 6 is furnished with graded steps comprising a large diameter portion 6a and a small diameter portion 6b. The large diameter portion 6a has the diameter considerably larger than the diameter of the operating fluid passage 4, and the diameter of the small diameter portion 6b is somewhere between the diameter of the large diameter portion 6a and the diameter of the operating fluid passage 4. A piston 7 is accommodated in this bore 6. This piston 7 is a piston with graded steps comprising a large diameter piston member 7a liquid-tightly and slidably engaged in the large diameter portion 6a of the bore 6 and a small diameter piston member 7b liquid-tightly and slidably engaged in the small diameter portion 6b of the bore 6. In this case, the large diameter piston member 7a is installed on the side of the electromagnetic valve 2 and the small diameter piston member 7b is furnished on the side of pump 3.

This piston 7 is also furnished with a through-hole 7c passing through from the large diameter piston member 7a toward the small diameter piston member 7b in axial direction. Further, the piston 7 is pushed toward the large diameter piston member 7a, i.e. upwardly in the drawing, at all times by a spring 8. The upward movement of this piston 7 is limited to a certain point by the upward movement limiting member 9 mounted above the piston 7. This upward movement limiting member 9 is also furnished with a through-hole 9a passing through to axial direction. The diameters of these two bores 7c and 9a are approximately the same as the diameter of the operating fluid passage 4, and they form a part of the operating fluid passage 4.

An operating fluid accommodating chamber 1a is formed between the piston 7 and the upward movement limiting member 9. When the piston 7 moves downward, the fluid accommodating chamber 1a has relatively large volume because the diameter of the large diameter portion 6a is considerably larger than the diameter of the operating fluid passage 4. The chamber 1b accommodating the spring 8 below the piston 7 is communicated with the atmospheric air.

Next, description will be given on the operation of this embodiment.

When it is detected during the braking operation that a wheel is in skid condition, the electromagnetic valve 2 corresponding to the wheel cylinder of the wheel is switched over, and the pump 3 is driven. Thus, the operating fluid in the wheel cylinder flows into the fluid accommodating chamber 1a through the electromagnetic valve 2, the operating fluid passage 4 and the through-hole 9a of the upward movement limiting member 9. Because the piston 7 moves downward against the force of the spring 8 because of the pressure difference above and below the piston and because the volume of the fluid accommodating chamber 1a is increased, a relatively large quantity of the operating fluid is accommodated in the liquid accommodating chamber 1a. The operating fluid in the fluid accommodating chamber 1a is sucked up by the pump 3 and flows toward the pump 3 through the through-hole 7c of the piston 7. It is then discharged from the pump 3 and is accumulated, for example, in an accumulator (not shown).

In this way, the brake pressure in the wheel cylinder is decreased, and the skid condition of the wheel is overcome.

Because the sump unit 1 is installed in the operating fluid passage 4 in this embodiment, it does not protrude extensively from the operating fluid passage 4 to the lateral direction. Accordingly, the anti-skid modulating unit can be relatively small in size.

Also, because the fluid accommodating chamber 1a is formed as a part of the operating fluid passage 4, the air intermingled with the operating fluid in the fluid accommodating chamber 1a can be easily withdrawn.

The present invention is not limited to the above embodiment, and a number of variants and design modifications can be conceived.

For example, the sump unit 1 is installed in the operating fluid passage 4 of linear shape in the above embodiment, while the sump unit 1 by this invention can be applied to the curved portion of the operating fluid passage curved at a certain angle (e.g. at right angle).

In the above embodiment, the sump unit 1 is installed in the anti-skid control unit, whereas the sump unit of this invention can be applied to the other fluid liquid control unit.

As it is evident from the above description, the sump unit by this invention is installed in the operating fluid passage and the fluid accommodating chamber is formed as a part of the operating fluid passage. Therefore, the sump unit does not protrude extensively from the operating fluid passage. Accordingly, the fluid pressure control unit can be designed in more compact form.

Because the fluid accommodating chamber of the sump unit is formed as a part of the operating fluid passage, the air intermingled with the operating fluid of the fluid accommodating chamber can be easily withdrawn, and this extensively facilitates the air vent of the fluid pressure control unit.

What we claim is:

1. A fluid control unit including a body means having an operating fluid passage formed therein of a predetermined diameter, said fluid passage including a first passage portion of greater diameter than said predetermined diameter and a second passage portion of greater diameter than said first passage portion, piston means including a first piston portion having a diameter and being slidably and liquid-tightly disposed within said first passage portion, said piston means including a second piston portion having a diameter greater than the diameter of said first piston portion and being slidable and liquid-tightly disposed in said second passage portion, said second piston portion defining with said body means an air chamber in communication with atmospheric air, biasing means urging said piston means in a first direction away from said first said passage portion, said second piston portion having an outer face remote from said first piston portion, said outer face defining a movable side of a fluid accommodating chamber for receiving fluid when said piston means moves in a second direction opposite to said first direction, said piston means having an axial passage passing completely therethrough and being in communication with said operating fluid passage.

2. A fluid pressure control unit as defined in claim 1 wherein said first and second piston portions are integral with one another.

3. A fluid pressure control unit as defined in claim 1 wherein said axial passage is of substantially the same diameter as said operating fluid passage.

4. A fluid pressure control unit as defined in claim 1 wherein said unit forms part of an anti-skid brake system including a wheel cylinder, said fluid accommodating chamber being communicatible with said wheel cylinder, an electromagnetic valve means for controlling communication between said fluid accommodating chamber and said wheel cylinder, and pump means in communication with said operating fluid passage and said first passage portion for drawing fluid from said fluid accommodating chamber and through said axial passage passing through said piston means.

* * * * *